UNITED STATES PATENT OFFICE.

TRUMAN S. FULLER, OF SCHENECTADY, NEW YORK, ASSIGNOR TO GENERAL ELECTRIC COMPANY, A CORPORATION OF NEW YORK.

BRAZING MATERIAL.

1,215,138.

Specification of Letters Patent. Patented Feb. 6, 1917.

No Drawing. Application filed January 29, 1915. Serial No. 5,141.

*To all whom it may concern:*

Be it known that I, TRUMAN S. FULLER, a citizen of the United States, residing at Schenectady, in the county of Schenectady, State of New York, have invented certain new and useful Improvements in Brazing Materials, of which the following is a specification.

For some brazing operations, for example, for the brazing of electrical connections, as for example, in locomotive armature windings, induction motors, rotary converters and the like, it is necessary that the brazing metal should have a melting point sufficiently high to insure against melting of the brazing metal during the use of the apparatus. On the other hand the melting point of the brazing metal should be low enough to enable the brazed parts to be separated for repair or other purposes, by melting the brazing alloy. Other considerations, such as the danger of injury during brazing to the metal joined, set an upper limit to the melting point permissible for the brazing metal. The brazing metal should be malleable and tenacious enough to be capable of being rolled into foil. It must alloy readily with the metal or metals to be brazed, and make a mechanically strong joint.

I have discovered that all these exacting conditions are met by alloys of silver and cadmium in which the silver content is within the limits of about 57 to 65 per cent. Small amounts of other brazing metals, such as copper, are permissible but readily oxidizable metals, such as aluminum, must be excluded.

The alloy may be prepared by melting silver in a suitable crucible in a hydrogen atmosphere and then adding cadmium in stick form, preferably, somewhat in excess of the desired proportion as some of the cadmium is volatilized. Instead of pure silver, sterling silver containing about 92.5% silver, and 7.5% copper may be used. Preferably I use 62.5% sterling silver and 37.5% cadmium, which results in an alloy of 57.8% silver, 37.5% cadmium and 4.7% copper. This alloy has a melting point of about 750° C.

The completed alloy is cast to sheet form about $\frac{1}{8}$ to $\frac{1}{4}$ inch in thickness and then rolled to foil. The foil may vary widely in thickness in accordance with the use to be made of it; ordinarily, the thickness is about 2 to 4 mils.

The surfaces of the metal parts to be joined, copper bars for example, are first coated with a fluxing paste consisting of three parts of $Na_2HPO_4$, known to the trade as sodium phosphate, one part boric acid and four parts water. The brazing foil is placed between the coated metal surfaces, pressure is applied and the parts are then heated electrically or otherwise to a temperature sufficient to melt the brazing metal.

What I claim as new and desire to secure by Letters Patent of the United States, is:—

1. The combination of a plurality of metal parts and an intervening alloy joined to and uniting said parts, said alloy consisting of a malleable, tenacious alloy of silver and cadmium, containing about 57 to 65 per cent. of silver, said alloy having a melting point of about 750° C.

2. The combination of copper parts and an intervening metal film joined to and uniting said copper parts, said film consisting of an alloy containing about 57 to 65 parts of silver, about 38 to 29 parts of cadmium and several per cent. of copper.

In witness whereof, I have hereunto set my hand this 28th day of January 1915.

TRUMAN S. FULLER.

Witnesses:
BENJAMIN B. HULL,
HELEN ORFORD.